8928X
R. DANIEL.
NAPPING MACHINE.
Patented June 26, 1835.
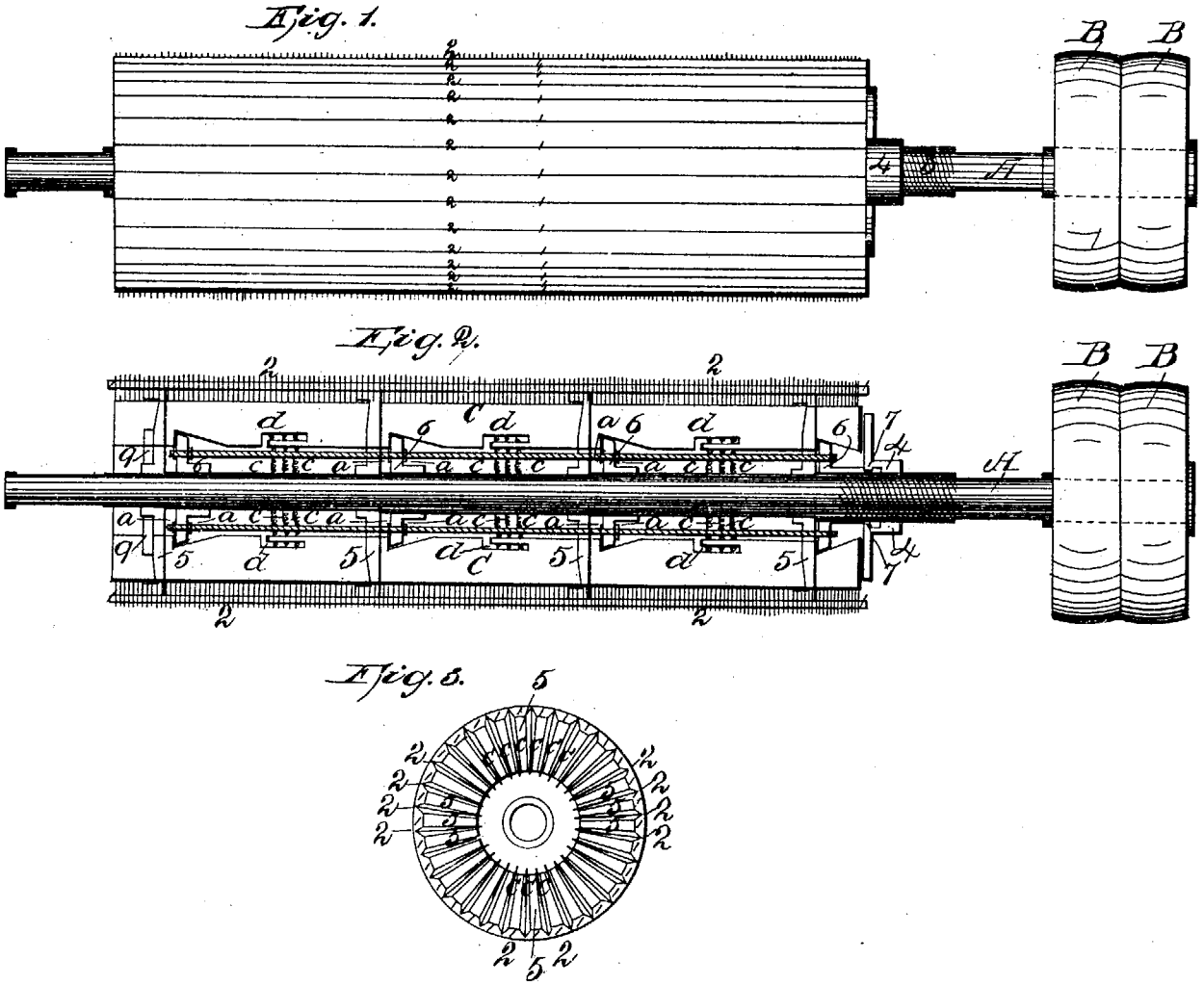

June 26. 1835

Reuben Daniels
Letters Patent 9928X

The Schedule referred to in these Letters Patent and making part of the same containing a description in the words of the said Reuben Daniels himself of his improvement in the construction of Metallic napping machines. To all to whom these presents shall come. Be it known that I Reuben Daniels of Woodstock in the County of Windsor & State of Vermont, have invented a new and useful improvement in the construction and operation of the metallic napping machine and that the following is a full and exact description of the construction and operation of said machine as invented or improved by me. viz. The machine here after described is designed for narrow cloths and the shaft upon which the operating or napping cylinder. is constructed, is four feet in length, and about two in diameter, having proper bearings, & one loose & one driving pulley. In all cases. the length & diameter or strength of the shaft must be accommodated to the width of the cloth to be napped. Drawings No 1 No II No III are hereby referred to, and made part of these specifications No 1 shews the napping cylinder completed No 11. shews a longitudinal section of the cylinder. No III shews a radiated slot head, more perfectly described hereafter On the shaft at a proper distance from the bearing at the left hand end of the shaft let there be placed a metallic head or wheel 9 3/4 inches in diameter, which head or wheel must be slotted from the periphery towards the centre in the form of rays, to the extent of two inches & one fourth towards the centre, Let these slots be twenty six in number & be cast with the wheel or head. Call this a "radiated slot head" as in

8928X in Drawings No III. At the right hand of this radiated slot
head, place three more of the same construction at the distance
of eleven inches asunder. At the bottom of each slot in each
radiated slot head, towards the centre, a slot of smaller di-
mentions must be sawed to receive the needle plates to be
hereafter described. These smaller slots should be so nicely
adjusted to the dimentions of needle plates as to permit
them to pass easily to & from the centre & still to limit
them to a very confined lateral motion. The needle plates are
constructed of nail plates having needles soldered on their
flat surfaces & extending one half inch or more beyond one
edge of the plate. These needle plates are to correspond
in number to the slots in the radiated slot heads their
motion in the slots to & from the centre is to regulate the
projection of the needles in the act or process of raising the
nap. The exterior portion of the radii formed by the slots.
or that portion which is most remote from the centre -
should be about 3/4" of an inch square and of sufficient
strength to receive a screw. On each of these projecting radii
Drawing No. III & 7 marked 5.5.5. &c is to be screwed a me-
tallic lag as seen in No. III. IIII. &c. so that when all the
lags are screwed on, they will form a metallic cylinder
except that between each lag a small space shall inter-
vene sufficient barely to permit the needles attached to the
nail plates to pass out or be drawn back at the pleasure
of the attendant. In No. II. 6,6,6,6. &c shews of loose collars
each having inclined planes on their largest periphery. —
These collars are connected by 3 rods as marked in No. II.
88 having a male screw cut on them from end to end.
At the right hand end of the shaft marked A. next to the
bearing is a female clamp screw marked 4,4, & on the shaft
A. a male screw marked 3 passing into the clamp. The
three screw rods connect all the loose collars by means of
nuts nuts running in the screw rods, so that one nut may be tur-
ned up close to each side of the flanch in the loose collars re-
spectively. The right hand loose collar is connected to the female
clamp screw by means of a groove cut in its smaller periphery
and a corresponding projection in the female clamp screw
locks into this groove, as shown in 7.7. No. II. The female clamp
screw & the four loose collars are thus all connected and the
collars running loose on the driving shaft can pass to the
right or left whenever the clamp screw is turned back or
forward. To effect this the attendant stops the machine
turns the clamp screw to the desired point & a spring dog
Ketches into a Knotch in the periphery and retains it
in its place. Corresponding to the number of slots in
the radiated slot heads there are needle plates two inches
in width of the length of the machine. These plates are
to pass through each slot in each radiated slot head.
In this machine there are twenty six. see No. III 2,2,2, &c
These plates having the needles soldered to them we call
needle plates. The needles are set a trifle less than 1/8 of
an inch asunder see drawing No. II. 2.2.2. &c These
needle plates have three slots each cut in them, one
between each of the loose collars. The object of these slots
as to permit spiral springs to pass through them so as to
connect the 26 needle plates by three circular bands each
consisting of three or more spiral springs passing around
the driving shaft. though at some distance from it. and all
tending to contract the needle plates to the shaft & to
bring them to the bottom of the smaller portion of the slots
as seen in No. III. and which are filled by the black lines
C. C. C. &c & shewing the ends of the needle plates.
When the needle plates are drawn home to the bottom
of the smaller slots by the contraction of the spiral springs.
the needles will not project beyond the metallic lags. At- At the left hand end of the machine around the hub of the radiated slot head & attached to & made fast to the hub is a cast iron collar extending one & half inches beyond it & around the hub marked q drawing No. II & one fourth of an inch in thickness. Corresponding to this collar. at the left hand end of all the needle plates, there is cut a slot one half inch in depth. as shewn in q No. II. All these plates being fitted onto this collar & the collar being attached to the radiated slot head, & this being fast to the driving shaft. the needle plates cannot move to the right or to the left. while at the same time the loose collars being connected by the three rods or long screws to the clamp screws at the right hand end of the machine. whenever the clamp screw is turned back or forward, the inclined plane on the loose collars will act against the inclined plane on the needle plates & either protrude them out beyond the metallic lags or permit the spiral springs to contract them below the lags. The cylinder will then present an uniform smooth surface with the exception of the interstices between the metallic lags. The clamp screw is attached to the loose collars by means of a groove cut in the small end of the collar next the clamp screws as shown in No. II 7.7. The screw rods thus pass through all the radiated slots heads & through all the loose collars, and all turn around the driving shaft together; but the loose collars have also a latteral motion on the driving shaft by means of the clamp screw. When the motion is to the right hand end of the machine. the inclined planes on the large periphery of the loose collars act on the inclined planes of the needle plates, & protrude them out beyond the metallic lags. When moved to the left. the spiral springs contract towards the center by this 5[illegible] 8928X 183 this operation the clamp screw and the inclined planes on the one part & the spiral springs on the other act as antagonists mechanical powers. In this way the precise amount of projection of the needles may be graduated and secured for the various kinds & stages of the work required. It is not material that the work of the machine be done precisely as here described; but many variations & much latitude of construction may be admitted & still the result be secured. Instead of needles, steel or other wire may be used, or the plates may be made of steel, & in place of needles, teeth corresponding to them may be cut in the plates. The remaining portion of the machine may be very similar to the teazling machine now in use with some obvious alterations. The machine will be used much as those at present employed with the exception that the motion of the metallic napping machine is much slower than that of a teazling machine. What I claim & all I claim as my invention in this machine is the principle or improvement of varying guaging or graduating the projection of the needles, wires or teeth which are designed to do the work performed by teazles in the common teazling machine. Or what will come to the same result. I claim the right of constructing the machine in such a manner as to regulate the projection of the needles beyond the metallic lags. by moving the needle plates to or from the centre, or by so constructing it that the needle plates shall be stationary & the metallic lags be capable of being moved to & from the centre & thus wholly to conceal the needles or to graduate their projection at the pleasure of the attendant. Woodstock Vt April 23d 1835

Witnesses David Pierce } Reuben Daniels
David S. Powers }

1782 [illegible] W.C.

(Drawing.)